(12) United States Patent
Hu et al.

(10) Patent No.: US 11,802,589 B2
(45) Date of Patent: Oct. 31, 2023

(54) BEARING ASSEMBLY AND COMPRESSOR WITH BEARING ASSEMBLY

(71) Applicant: GREE GREEN REFRIGERATION TECHNOLOGY CENTER CO., LTD. OF ZHUHAI, Zhuhai (CN)

(72) Inventors: Yusheng Hu, Zhuhai (CN); Liying Deng, Zhuhai (CN); Jinfei Shi, Zhuhai (CN); Wenjiao Sun, Zhuhai (CN); Guomang Yang, Zhuhai (CN); Shebing Liang, Zhuhai (CN); Pengkai Wan, Zhuhai (CN)

(73) Assignee: GREE GREEN REFRIGERATION TECHNOLOGY CENTER CO., LTD. OF ZHUHAI, Zhuhai (CN)

( * ) Notice: Subject to any disclaimer, the term of this patent is extended or adjusted under 35 U.S.C. 154(b) by 389 days.

(21) Appl. No.: 17/051,114

(22) PCT Filed: Dec. 12, 2018

(86) PCT No.: PCT/CN2018/120668
§ 371 (c)(1),
(2) Date: Oct. 27, 2020

(87) PCT Pub. No.: WO2020/042434
PCT Pub. Date: Mar. 5, 2020

(65) Prior Publication Data
US 2021/0231175 A1 Jul. 29, 2021

(30) Foreign Application Priority Data
Aug. 31, 2018 (CN) .......................... 201811015076.6

(51) Int. Cl.
*F16C 33/58* (2006.01)
*F16C 33/66* (2006.01)
*F04C 29/00* (2006.01)

(52) U.S. Cl.
CPC ............ *F16C 33/583* (2013.01); *F04C 29/00* (2013.01); *F16C 33/6648* (2013.01); *F16C 33/6681* (2013.01); *F16C 2360/42* (2013.01)

(58) Field of Classification Search
CPC .... F16C 33/46; F16C 33/586; F16C 33/6659; F16C 33/583; F16C 33/6648;
(Continued)

(56) References Cited

U.S. PATENT DOCUMENTS 10,774,646 B2 * 9/2020 Lee .......................... F02B 55/14
2007/0154128 A1 7/2007 Mikami
(Continued)

FOREIGN PATENT DOCUMENTS

CN 105805164 A 7/2016
CN 107013571 A 8/2017
(Continued)

OTHER PUBLICATIONS

Machine Translation JP 2008-151180 (Year: 2023).*
(Continued)

*Primary Examiner* — Mickey H France
*Assistant Examiner* — Dapinder Singh
(74) *Attorney, Agent, or Firm* — Armstrong Teasdale LLP

(57) ABSTRACT

Some embodiments of the disclosure disclose a bearing assembly and a compressor with the bearing assembly. The bearing assembly includes: a retainer assembly (50), a bearing stationary ring (40), and a bearing rotary ring (10). The retainer assembly (50) is disposed between the bearing stationary ring (40) and the bearing rotary ring (10). A lubrication passage is provided in an end face of the bearing rotary ring (10).

17 Claims, 10 Drawing Sheets

(58) Field of Classification Search
CPC ...... F16C 33/6681; F16C 19/06; F16C 19/26; F16C 2360/42; F16C 2360/44; F01C 2/02
See application file for complete search history.

(56) References Cited

U.S. PATENT DOCUMENTS

| | | | |
|---|---|---|---|
| 2009/0046965 | A1 | 2/2009 | Akamatsu |
| 2012/0027570 | A1* | 2/2012 | Cigal .................... F01D 25/18 415/110 |
| 2016/0097457 | A1 | 4/2016 | Sun |
| 2017/0227055 | A1* | 8/2017 | Manabe ............. F16C 33/6648 |

FOREIGN PATENT DOCUMENTS

| | | |
|---|---|---|
| CN | 206555292 U | 10/2017 |
| CN | 107524600 A | 12/2017 |
| CN | 107559202 A | 1/2018 |
| CN | 207349088 U | 5/2018 |
| CN | 108825663 A | 11/2018 |
| CN | 108916234 A | 11/2018 |
| CN | 208749829 U | 4/2019 |
| DE | 102009032294 A1 | 1/2011 |
| EP | 1541884 A1 | 6/2005 |
| EP | 2412938 A2 | 2/2012 |
| JP | S63231021 A | 9/1988 |
| JP | H1047360 A | 2/1998 |
| JP | H10325416 A | 12/1998 |
| JP | 2001012481 A | 1/2001 |
| JP | 2001124066 A | 5/2001 |
| JP | 2006118525 A | 5/2006 |
| JP | 2007321977 A | 12/2007 |
| JP | 2008-151180 * | 3/2008 |
| JP | 2009174701 A | 8/2009 |
| JP | 2013130275 A | 7/2013 |
| KR | 101514148 B1 | 4/2015 |
| WO | 2007129441 A1 | 11/2007 |

OTHER PUBLICATIONS

International Search Report for corresponding PCT/CN2018/120668, dated May 5, 2019, 3 pages.

Extended European Search Report issued in European Patent Application No. 18932274.6, dated Jun. 17, 2021, 10 pages.

* cited by examiner

BEARING ASSEMBLY AND COMPRESSOR WITH BEARING ASSEMBLY

CROSS-REFERENCE TO RELATED APPLICATION(S)

The present disclosure is a national stage application of International Patent Application No. PCT/CN2018/120668, filed on Dec. 12, 2018, and claiming priority to Chinese Patent Priority No. 201811015076.6, filed to the National Intellectual Property Administration, PRC on Aug. 31, 2018, entitled "Bearing Assembly and Compressor with Bearing Assembly," the disclosure of which are hereby incorporated by reference in their entirety.

TECHNICAL FIELD

The disclosure relates to a field of compressors, in particular to a bearing assembly and a compressor with the bearing assembly.

BACKGROUND

During an operation of a rotary vane compressor, the wear power consumption of a head of a sliding vane is high. In order to reduce this part of power consumption, an inner ring of a rolling bearing is used as a cylinder, which follows the sliding vane to rotate around a spindle, so that a sliding friction between the head of the sliding vane and an internal face of the cylinder is converted into a rolling friction between the head of the sliding vane and the rolling bearing, which greatly reduces a wear power consumption of the head of the sliding vane.

Because a bearing inner ring rotates with the sliding vane, an end face of the inner ring and an end face of a flange become a friction pair, and because a diameter of the inner ring is large, a linear velocity is high, and a friction power consumption here is proportional to the square of the linear velocity, in the solution, the wear power consumption of the end face of the bearing inner ring and the flange is relatively large, and in serious cases, abnormal wear is formed, which reduces the performance of the compressor and affects the reliability of the compressor.

SUMMARY

Some embodiments of the disclosure provide a bearing assembly and a compressor with the bearing assembly, so as to solve a problem that an end face of a bearing rotary ring of the bearing assembly in the art known to inventors is worn excessively.

According to some embodiments of the disclosure, a bearing assembly is provided, which includes: a retainer assembly, a bearing stationary ring and a bearing rotary ring. The retainer assembly is disposed between the bearing stationary ring and the bearing rotary ring. A lubrication passage is provided in an end face of the bearing rotary ring.

In some embodiments, the lubrication passage includes: a first lubrication passage provided in the end face of the bearing rotary ring. The first lubrication passage extends along a circumferential direction of the bearing rotary ring.

In some embodiments, the first lubrication passage is an annular oil channel, and the first lubrication passage has a first side wall and a second side wall arranged opposite to the first side wall. Both projections of the first side wall and the second side wall on the end face of the bearing rotary ring are circular.

In some embodiments, there are at least two first lubrication passages, and the first lubrication passages are disposed at intervals in a direction from a circumferential outer surface of the bearing rotary ring to a circumferential inner surface of the bearing rotary ring.

In some embodiments, the at least two first lubrication passages are communicated.

In some embodiments, there are two first lubrication passages. The first of the two first lubrication passages and the second of the two first lubrication passages are disposed in turn in the direction from the circumferential outer surface of the bearing rotary ring to the circumferential inner surface of the bearing rotary ring. A depth of the first of the two first lubrication passages is h2, a depth of the second of the two first lubrication passages is h5, a height of the bearing rotary ring is H, and 0.05 mm≤h5≤h2≤0.1 H.

In some embodiments, a total width of the at least two first lubrication passages is a, an inner diameter of the bearing rotary ring is r1, an outer diameter of the bearing rotary ring is r4, wherein, a≤0.5*(r4−r1).

In some embodiments, the first lubrication passage includes a first side wall and a second side wall arranged opposite to the first side wall, both the first side wall and the second side wall are arc surfaces, an inner diameter of the bearing rotary ring is r1, an outer diameter of the bearing rotary ring is r4, a radius of the first side wall is r2, a radius of the second side wall is r3, wherein, r3>r2, 0.1*(r4−1)≤r2−r1≤0.8*(r4-r1).

In some embodiments, the first lubrication passage includes a first side wall and a second side wall arranged opposite to the first side wall, both the first side wall and the second side wall are arc surfaces, an inner diameter of the bearing rotary ring is r1, an outer diameter of the bearing rotary ring is r4, a radius of the first side wall is r2, a radius of the second side wall is r3, wherein, 0.05 mm≤r3−r2≤0.5*(r4−r1).

In some embodiments, the lubrication passage further includes: a second lubrication passage provided in the end face of the bearing rotary ring. The second lubrication passage is communicated with the first lubrication passage.

In some embodiments, the second lubrication passage is provided with an oil inlet and an oil outlet, the oil inlet intersects with a circumferential outer surface of the bearing rotary ring, and the oil outlet is connected with the first lubrication passage.

In some embodiments, the oil inlet and the oil outlet are disposed in turn along a rotation direction of the bearing rotary ring.

In some embodiments, the second lubrication passage is an expansion groove, and the second lubrication passage gradually expands from the oil outlet to the oil inlet.

In some embodiments a first connection plane is provided between a first end of the oil outlet and a first end of the oil inlet, a second connection plane is provided between a second end of the oil outlet and a second end of the oil inlet, a preset included angle b is provided between the first connection plane and the second connection plane, wherein, 0≤b≤60°.

In some embodiments, the second lubrication passage includes a third side wall and a fourth side wall arranged opposite to the third side wall, and both the third side wall and the fourth side wall are arc surfaces.

In some embodiments, a preset gap h0 is provided between centers of the third side wall and the fourth side wall, the first lubrication passage includes a first side wall and a second side wall arranged opposite to the first side wall, the second side wall intersects with the second lubrication passage, the second side wall is an arc surface, an inner diameter of the bearing rotary ring is r1, an outer diameter of the bearing rotary ring is r4, a radius of the second side wall is r3, a radius of the third side wall is r5, a radius of the fourth side wall is r6, and h0+(r4−r1) ≤r5≤r6≤2r3, h0≤0.2r3.

In some embodiments, a height of the bearing rotary ring is H, a depth of the first lubrication passage is h2, a depth of the second lubrication passage is h1, wherein, 0.05 mm≤h1≤h2≤0.1 H.

In some embodiments, there are a plurality of first lubrication passages, and the plurality of first lubrication passages are disposed at intervals in a circumferential direction of the end face of the bearing rotary ring.

In some embodiments, the bearing assembly further includes: a third lubrication passage provided in a circumferential outer surface of the bearing rotary ring. The third lubrication passage is communicated with the lubrication passage.

In some embodiments, both two end faces of the bearing rotary ring are provided with the lubrication passages.

According to some embodiments of the disclosure, a compressor is provided, which includes the above mentioned bearing assembly.

In some embodiments, the bearing rotary ring of the bearing assembly is a bearing inner ring. The compressor further includes: an upper flange and a lower flange. The bearing assembly is disposed between the upper flange and the lower flange. The bearing rotary ring is rotationally disposed with respect to the upper flange, and is rotationally disposed with respect to the lower flange.

The bearing assembly of some embodiments of the disclosure includes the lubrication passage on the end face of the bearing rotary ring, so that when the bearing rotary ring rotates, lubricating oil is diffused from the lubrication passage to the end face of the bearing rotary ring, and then there is sufficient lubricating oil between the end face of the bearing rotary ring and its adjacent parts, so as to prevent wear in a contact process, and solve a problem that the end face of the bearing rotary ring of the bearing assembly in the art known to inventors is worn excessively.

BRIEF DESCRIPTION OF THE DRAWINGS

The accompanying drawings constituting a part of some embodiments of the present disclosure are used for providing further understanding of the disclosure. Schematic embodiments of the disclosure and description thereof are used for illustrating some embodiments of the disclosure and not intended to form an improper limit to some embodiments of the disclosure. In the accompanying drawings.

Figure 1:
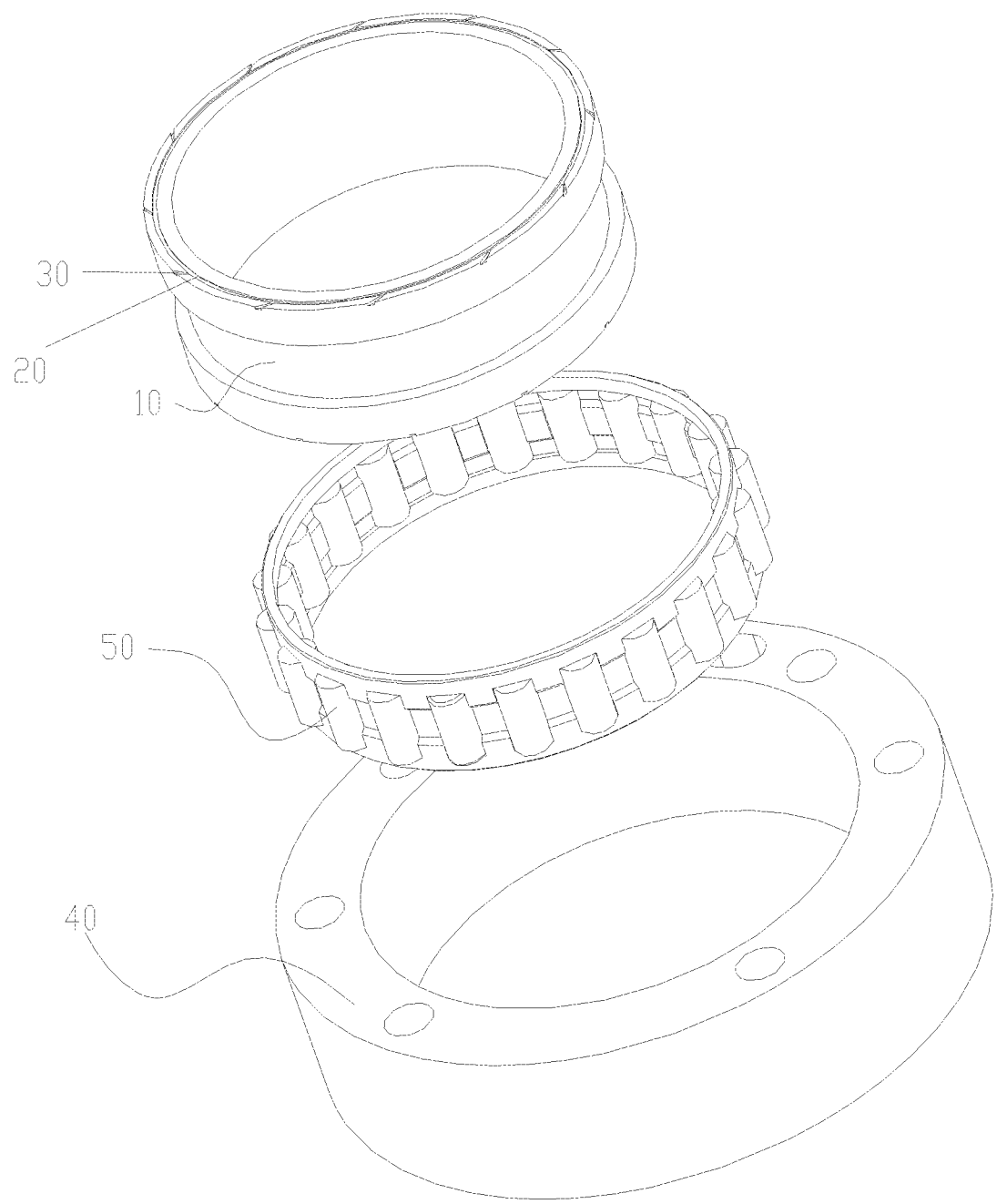
FIG. 1 illustrates an exploded structure diagram of some embodiments of a bearing assembly according to the disclosure.

The above accompanying drawings include the following reference numbers:

10. bearing rotary ring; 20. first lubrication passage; 21. first side wall; 22. second side wall; 30. second lubrication passage; 31. oil inlet; 32. oil outlet; 33. third side wall; 34. fourth side wall; 40. bearing stationary ring; 50. retainer assembly; 60. upper flange; 70. lower flange; 80. spindle; 90. sliding vane; 100. lower cover plate; 110. pump body screw; 120. compression chamber; 130. bearing race.

DETAILED DESCRIPTION OF THE EMBODIMENTS

It is to be noted that the embodiments in the disclosure and characteristics in the embodiments may be combined without conflicts. The disclosure is elaborated below with reference to the accompanying drawings and embodiments.

It should be noted that the following detailed description is illustrative and is intended to provide a further description of the present disclosure. Unless otherwise indicated, all technical and scientific terms used herein have the same meaning as that commonly understood by those of ordinary skill in the art to which the present disclosure belongs.

It is to be noted that terms used herein are only to describe specific embodiments, and are not intended to limit the exemplary embodiments of the present disclosure. As used herein, unless otherwise explicitly indicated in the context, a singular form is also intended to include a plural form. In addition, it is also to be understood that when the terms "include" and/or "have" are used in the description, they are intended to indicate the presence of features, steps, operations, devices, components, and/or combinations thereof.

Some embodiments of the disclosure provide a bearing assembly. Referring to FIG. 1 to FIG. 7, the bearing assembly includes: a retainer assembly 50, a bearing stationary ring 40 and a bearing rotary ring 10. The retainer assembly 50 is disposed between the bearing stationary ring 40 and the bearing rotary ring. A lubrication passage is provided in an end face of the bearing rotary ring 10.

The bearing assembly of some embodiments of the disclosure is provided with the lubrication passage on the end face of the bearing rotary ring 10, so that when the bearing rotary ring 10 rotates, lubricating oil is diffused from the lubrication passage to the end face of the bearing rotary ring, and then there is sufficient lubricating oil between the end face of the bearing rotary ring 10 and its adjacent parts, so as to prevent wear in a contact process, and solve the problem that the end face of the bearing rotary ring 10 of the bearing assembly in the art known to inventors is worn excessively.

In some embodiments, the bearing assembly is composed of the retainer assembly 50, the bearing stationary ring 40 and the bearing rotary ring 10. The retainer assembly 50 is disposed between the bearing stationary ring 40 and the bearing rotary ring. The bearing rotary ring 10 is rotationally arranged with respect to the bearing stationary ring 40.

In some embodiments, the bearing stationary ring 40 is a bearing outer ring, and the bearing rotary ring 10 is a bearing inner ring.

For the specific composition of the lubrication channels, in some embodiments, as shown in FIG. 1, the lubrication passage includes a first lubrication passage 20 provided in the end face of the bearing rotary ring 10. The first lubrication passage 20 extends along a circumferential direction of the bearing rotary ring 10.

In some embodiments, the first lubrication passage 20 is provided in the end face of the bearing rotary ring 10 and in a middle of the end face of the bearing rotary ring 10, that is, the first lubrication passage 20 is arranged with both a circumferential inner surface and a circumferential outer surface of the bearing rotary ring with spacing. Considering that the bearing rotary ring 10 is an annular structure, the first lubrication passage 20 extends along the circumferential direction of the bearing rotary ring 10, so as to ensure sufficient lubrication.

Figure 2:
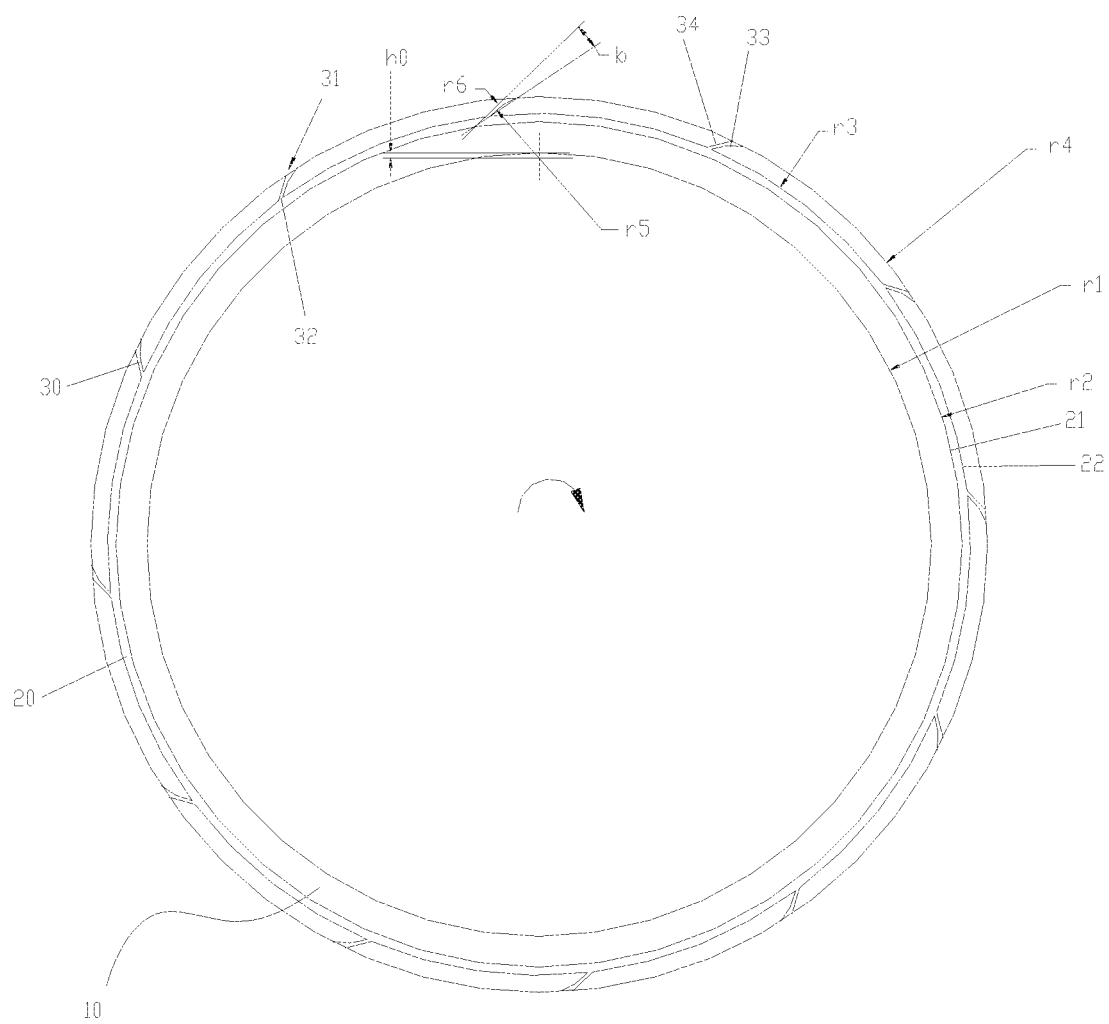
FIG. 2 illustrates a structure diagram of the first embodiment of a bearing assembly according to the disclosure.
Figure 5:
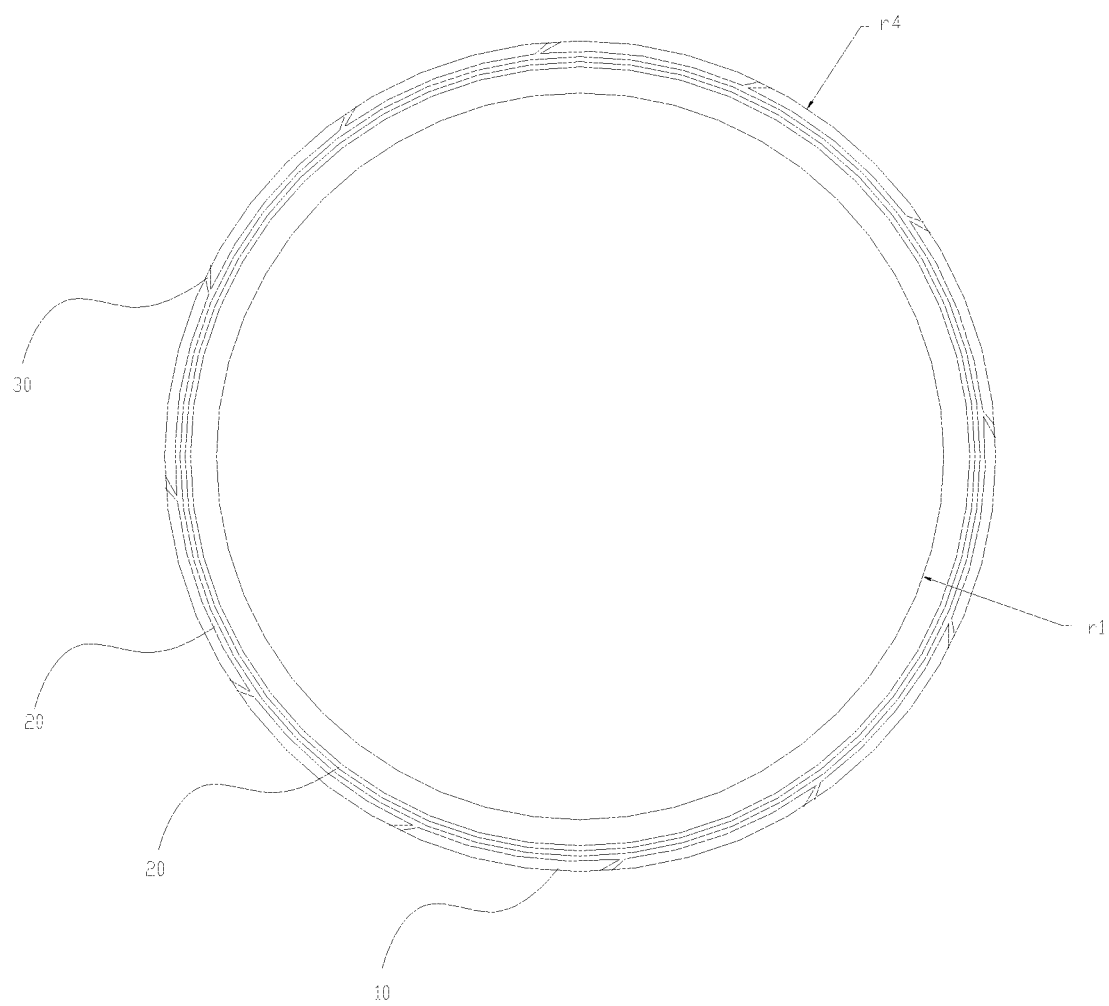
FIG. 5 illustrates a structure diagram of the second embodiment of a bearing assembly according to the disclosure.

For the specific structure of the first lubrication passage 20, in some embodiments, as shown in FIG. 2 and FIG. 5, the first lubrication passage 20 is an annular oil channel, and the first lubrication passage 20 includes a first side wall 21 and a second side wall 22 arranged opposite to the first side wall 21. Both projections of the first side wall 21 and the second side wall 22 on the end face of the bearing rotary ring 10 are circular.

Figure 6:
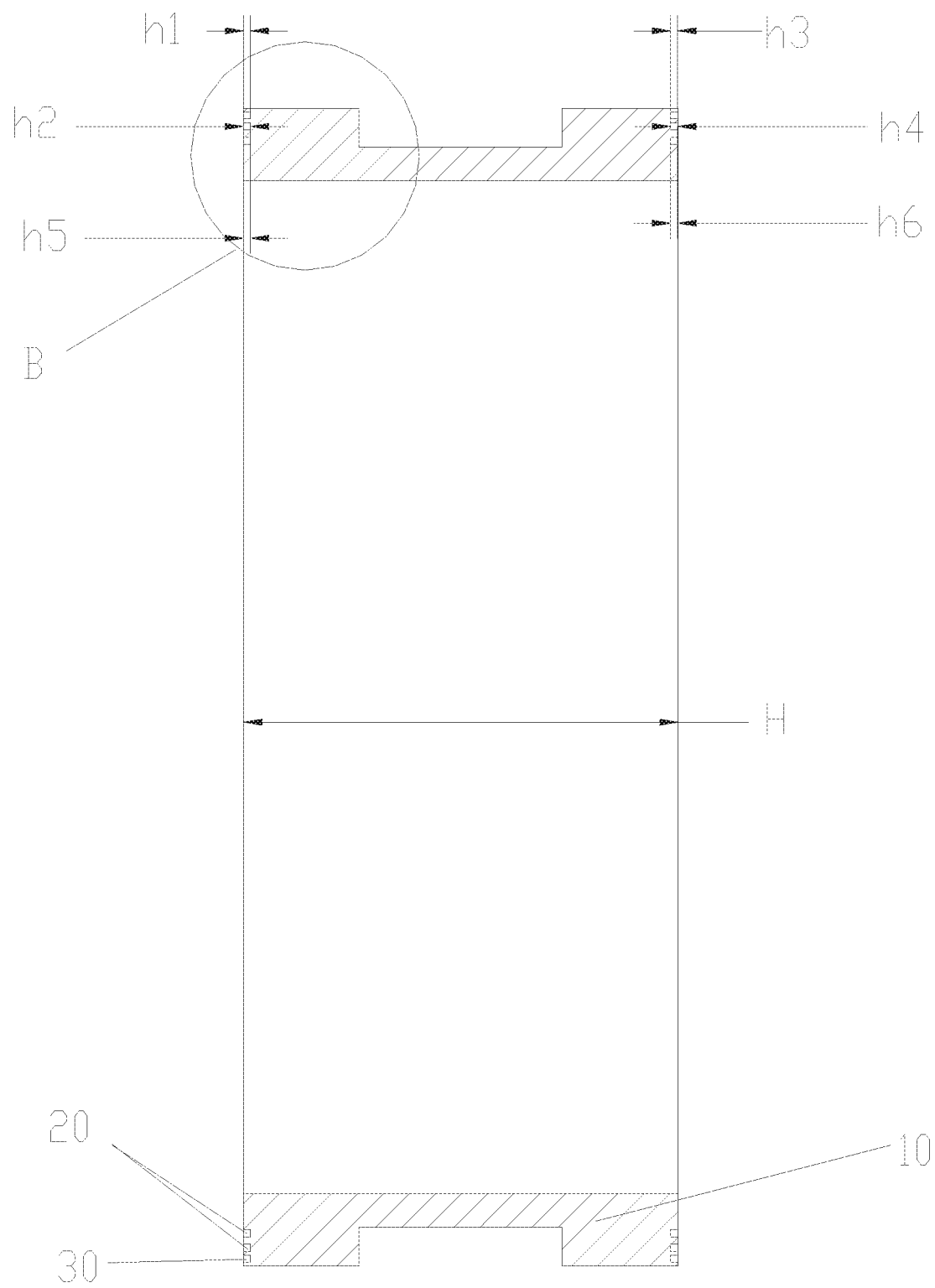
FIG. 6 illustrates a section structure diagram of the second embodiment of a bearing assembly according to the disclosure.
Figure 7:
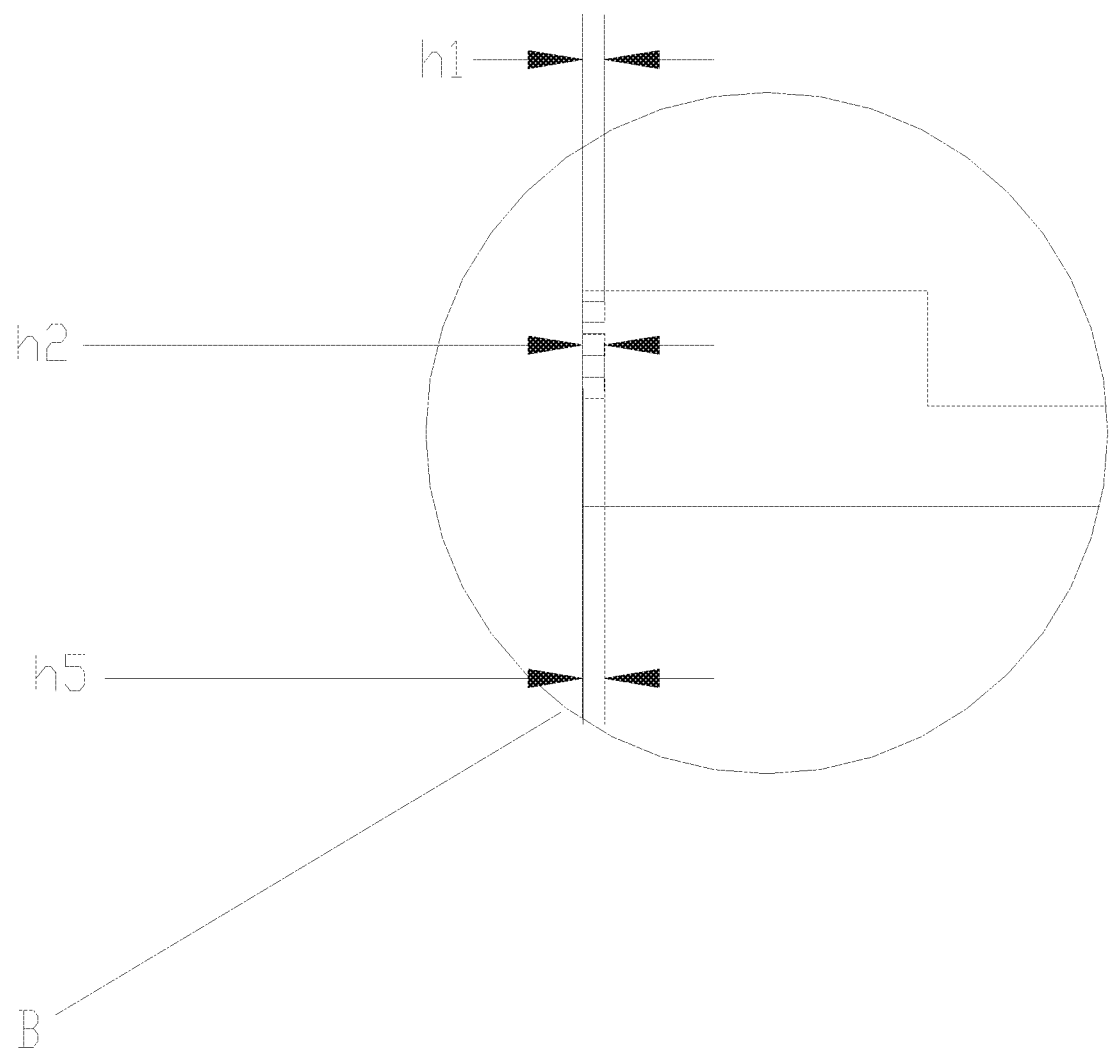
FIG. 7 illustrates a partially enlarged structure diagram of part B of the bearing assembly in FIG. 6.

For some embodiments of the first lubrication passage 20, as shown in FIG. 5 to FIG. 7, there are at least two first lubrication passages 20, and the at least two first lubrication passages 20 are disposed at intervals in the direction from a circumferential outer surface of the bearing rotary ring 10 to a circumferential inner surface of the bearing rotary ring 10.

In some embodiments, there are at least two first lubrication passages 20, and the first lubrication passages 20 are disposed at intervals in the direction from the circumferential outer surface of the bearing rotary ring 10 to the circumferential inner surface of the bearing rotary ring 10, that is, a plurality of annular oil channels are disposed from inside to outside around an inner hole of the bearing rotary ring 10, and the first lubrication passages 20 are not communicated with each other.

In some embodiments, there are two first lubrication passages 20.

In some embodiments, at least two first lubrication passages 20 are communicated.

For a depth of the first lubrication passage 20, as shown in FIG. 6 and FIG. 7, there are two first lubrication passages 20, and the first of the two first lubrication passages 20 and the second of the two first lubrication passages 20 are disposed in turn in the direction from the circumferential outer surface of the bearing rotary ring 10 to the circumferential inner surface of the bearing rotary ring 10. A depth of the first of the two first lubrication passages 20 is h2, a depth of the second of the first lubrication passages 20 is h5, a height of the bearing rotary ring 10 is H, and 0.05 mm≤h5≤h2≤0.1 H.

In some embodiments, the depths of the first lubrication passages 20 decrease in turn in the direction from the circumferential outer surface of the bearing rotary ring 10 to the circumferential inner surface of the bearing rotary ring 10.

In order to ensure the reliability of the structure, as shown in FIG. 5, a total width of the plurality of first lubrication passages 20 is a, an inner diameter of the bearing rotary ring 10 is r1, an outer diameter of the bearing rotary ring 10 is r4, and a≤0.5*(r4−r1).

In some embodiments, the total width of the plurality of first lubrication passages 20 is at most half of a thickness of the bearing rotary ring 10.

Figure 3:
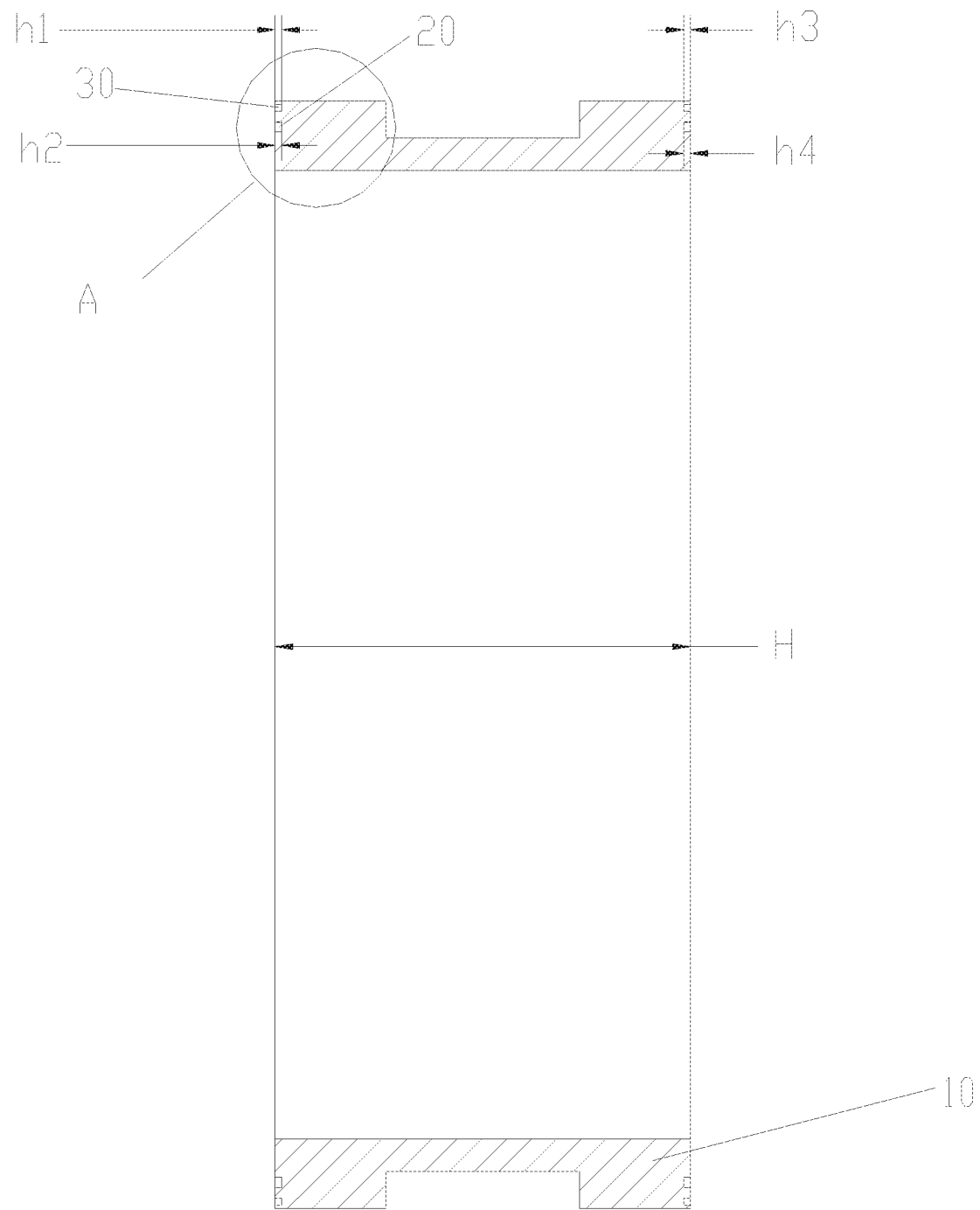
FIG. 3 illustrates a section structure diagram of the first embodiment of a bearing assembly according to the disclosure.
Figure 4:
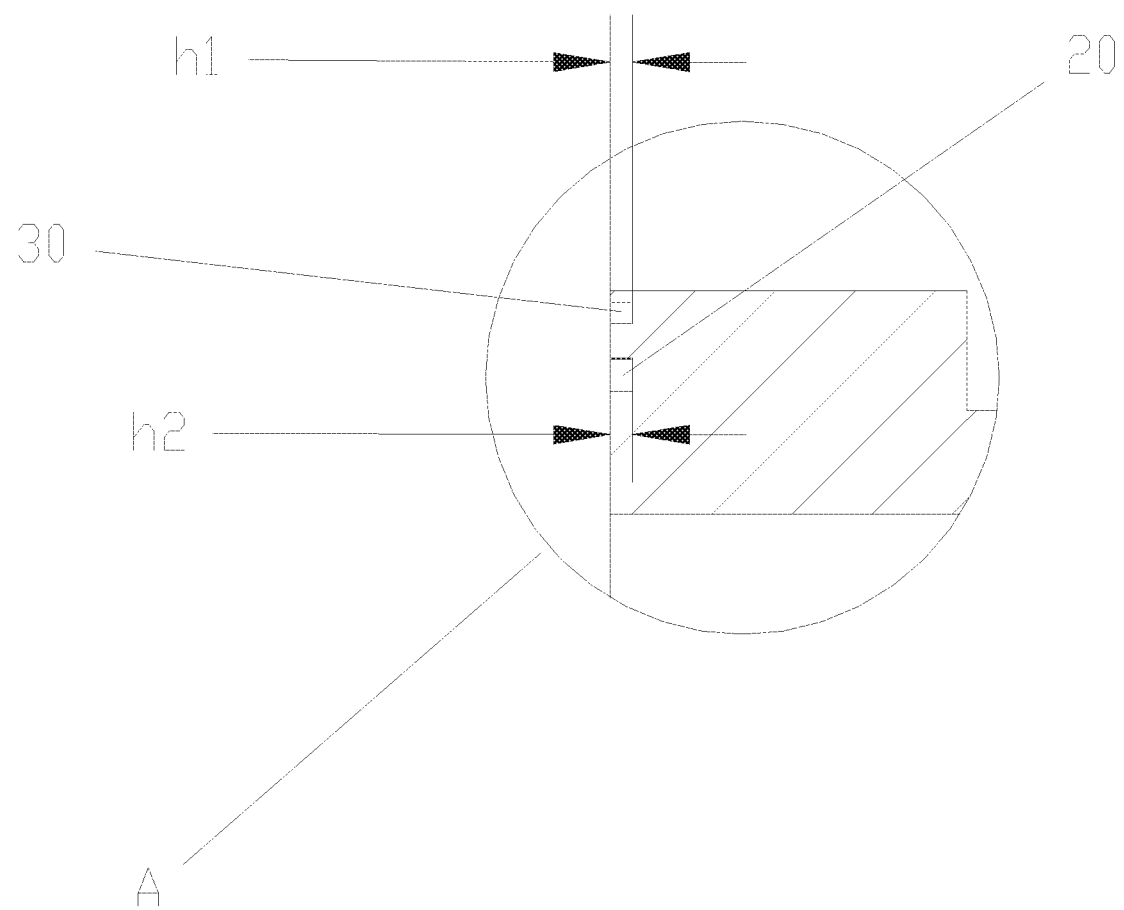
FIG. 4 illustrates a partially enlarged structure diagram of part A of the bearing assembly in FIG. 3.

For some embodiments of the first lubrication passage 20, as shown in FIG. 2 to FIG. 4, the first lubrication passage 20 includes a first side wall 21 and a second side wall 22 arranged opposite to the first side wall 21, both the first side wall 21 and the second side wall 22 are arc surfaces, the inner diameter of the bearing rotary ring 10 is r1, the outer diameter of the bearing rotary ring 10 is r4, a radius of the first side wall 21 is r2, a radius of the second side wall 22 is r3, wherein, r3>r2, 0.1*(r4−r1)≤r2−r1≤0.8*(r4−r1).

In some embodiments, the first lubrication passage 20 is an annular groove, that is, both the first side wall 21 and the second side wall 22 of the first lubrication passage 20 are arc surfaces.

In some embodiments, as shown in FIG. 3, the first lubrication passage 20 includes the first side wall 21 and the second side wall 22 arranged opposite to the first side wall 21, both the first side wall 21 and the second side wall 22 are arc surfaces, the inner diameter of the bearing rotary ring 10 is r1, the outer diameter of the bearing rotary ring 10 is r4, the radius of the first side wall 21 is r2, the radius of the second side wall 22 is r3, and 0.05 mm≤r3−r2≤0.5*(r4−r1).

In order to ensure sufficient lubricating oil in the first lubrication passage 20, in some embodiments, as shown in FIG. 1, the lubrication passage further includes a second lubrication passage 30 provided in the end face of the bearing rotary ring 10. The second lubrication passage 30 is communicated with the first lubrication passage 20.

In some embodiments, by providing the second lubrication passage 30 on the end face of the bearing rotary ring 10, and connecting the second lubrication passage 30 with the first lubrication passage 20, the lubricating oil in the second lubrication passage 30 enters into the first lubrication passage 20, so as to lubricate the end face of the bearing rotary ring 10.

Considering that the lubricating oil comes from a bearing race 130, the lubricating oil needs to enter into the end face of the bearing rotary ring 10 through the circumferential outer surface of the bearing rotary ring 10. As shown in FIG. 2, in some embodiments, the second lubrication passage 30 is provided with an oil inlet 31 and an oil outlet, the oil inlet 31 intersects with the circumferential outer surface of the bearing rotary ring 10, and the oil outlet 32 is communicated with the first lubrication passage 20.

In some embodiments, the oil inlet 31 of the second lubrication passage 30 intersects with the circumferential outer surface of the bearing rotary ring 10, that is, the oil inlet 31 is located on the circumferential outer surface of the bearing rotary ring 10 to facilitate the entering of oil, and the lubricating oil entering into the second lubrication passage 30 enters into the first lubrication passage 20 through the oil outlet 32.

In some embodiments, the oil inlet 31 and the oil outlet 32 are disposed in turn along a rotation direction of the bearing rotary ring 10.

In some embodiments, the second lubrication passage 30 is a fan-shaped oil groove, and the bearing rotary ring 10 is a bearing inner ring. An opening direction of the fan-shaped oil groove is consistent with the rotation direction of the bearing inner ring. When the bearing inner ring rotates at a high speed along with a sliding vane 90, the oil enters into an annular oil groove (the first lubrication passage 20) from an opening of the fan-shaped oil groove, under an action of a rotational centrifugal force of the inner ring of the bearing, an oil pressure in the annular oil groove increases with the increase of a rotational speed, so that the hydraulic lubrication is formed between an end face of the inner ring of the bearing and an end face of a flange.

In some embodiments, the second lubrication passage 30 is an expansion groove, and the second lubrication passage 30 gradually expands from the oil outlet 32 to the oil inlet 31.

In some embodiments, a first connection plane is provided between a first end of the oil outlet 32 and a first end of the oil inlet 31, a second connection plane is provided between a second end of the oil outlet 32 and a second end of the oil inlet 31, a preset included angle b is provided between the first connection plane and the second connection plane, wherein, $0 \leq b \leq 60°$.

In some embodiments, the first end of the oil outlet 32 and the first end of the oil inlet 31, and the second end of the oil outlet 32 and the second end of the oil inlet 31 forms a tapered opening, namely the preset included angle b is formed between the first connection plane and the second connection plane.

In some embodiments, the second lubrication passage 30 includes a third side wall 33 and a fourth side wall 34 arranged opposite to the third side wall 33, and both the third side wall 33 and the fourth side wall 34 are arc surfaces.

In some embodiments, the number of the second lubrication passages 30 are limited to 5-30.

In some embodiments, the second lubrication passage 30 is an arc-shaped groove, that is, both the third side wall 33 and the fourth side wall 34 of the second lubrication passage 30 are arc surfaces.

In some embodiments, as shown in FIG. 2, a preset gap h0 is provided between centers of the third side wall 33 and the fourth side wall 34, the first lubrication passage 20 includes the first side wall 21 and the second side wall 22 arranged opposite to the first side wall 21, the second side wall 22 intersects with the second lubrication passage 30, the second side wall 22 is the arc surface, the inner diameter of the bearing rotary ring 10 is r1, the outer diameter of the bearing rotary ring 10 is r4, the radius of the second side wall 22 is r3, the radius of the third side wall 33 is r5, the radius of the fourth side wall 34 is r6, wherein, $h0+(r4-r1) \leq r5 \leq r6 \leq 2r3$, $h0 \leq 0.2r3$.

For a depth relationship between the first lubrication passage 20 and the second lubrication passage 30, in some embodiments, as shown in FIG. 3 and FIG. 4, the height of the bearing rotary ring 10 is H, the depth of the first lubrication passage 20 is h2, the depth of the second lubrication passage 30 is h1, wherein, $0.05 \text{ mm} \leq h1 \leq h2 \leq 0.1H$.

For another way of distributing the first lubrication passages 20, in some embodiments, there are a plurality of first lubrication passages 20, and the plurality of first lubrication passages 20 are arranged with spacing in the circumferential direction of the end face of the bearing rotary ring 10.

In some embodiments, there are the plurality of first lubrication passages 20, and the plurality of first lubrication passages 20 are arranged with spacing in the circumferential direction of the end face of the bearing rotary ring 10, that is, multiple arc grooves are disposed with spacing in the circumferential direction of the end face of the bearing rotary ring 10, and their radius values are all equal.

In some embodiments, the bearing assembly further includes a third lubrication passage provided in a circumferential outer surface of the bearing rotary ring 10. The third lubrication passage is communicated with the lubrication passage.

In some embodiments, by providing the third lubrication passage on the circumferential outer surface of the bearing rotary ring 10, the third lubrication passage conveniently introduces the lubricating oil into the lubrication passage.

In some embodiments, both the two end faces of the bearing rotary ring 10 are provided with the lubrication passages.

In some embodiments, when both the two end faces of the bearing rotary ring 10 are provided with the lubrication passages, for some embodiments of the depth relationship between the first lubrication passage 20 and the second lubrication passage 30, as shown in FIG. 3 and FIG. 4, $0.05 \text{ mm} \leq h1 \leq h2 \leq 0.1H$, and $0.05 \text{ mm} \leq h3 \leq h4 \leq 0.1H$.

In some embodiments, when both the two end faces of the bearing rotary ring 10 are provided with the lubrication passages, for the first lubrication passage 20, as shown in FIG. 6 and FIG. 7, there are two first lubrication passages 20, and the first of the two first lubrication passages 20 and the second of the two first lubrication passages 20 are disposed in turn in the direction from the circumferential outer surface of the bearing rotary ring 10 to the circumferential inner surface of the bearing rotary ring 10, wherein, $0.05 \text{ mm} \leq h5 \leq h2 \leq 0.1H21$, and $0.05 \text{ mm} \leq h6 \leq h4 \leq 0.1H$.

Figure 8:
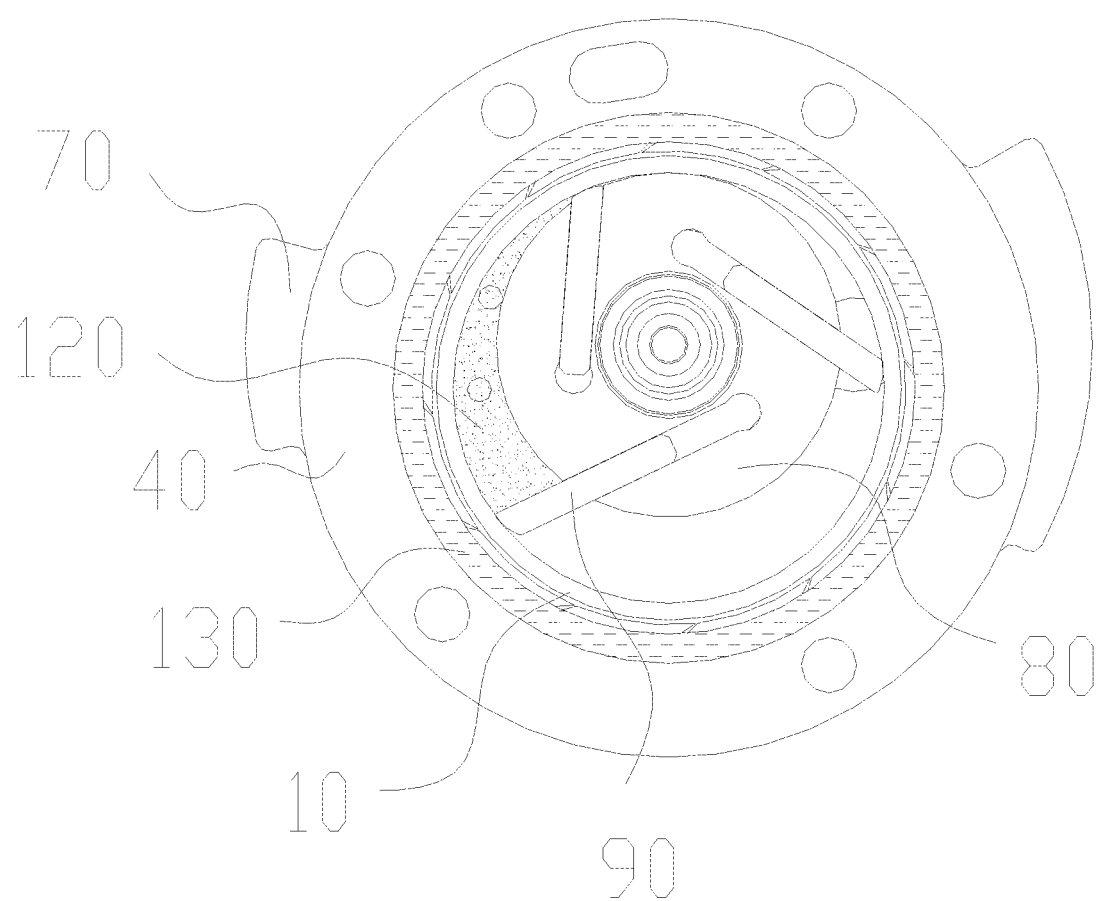
FIG. 8 illustrates a top view of a state of a partial structure of a compressor according to some embodiments of the disclosure.
Figure 9:
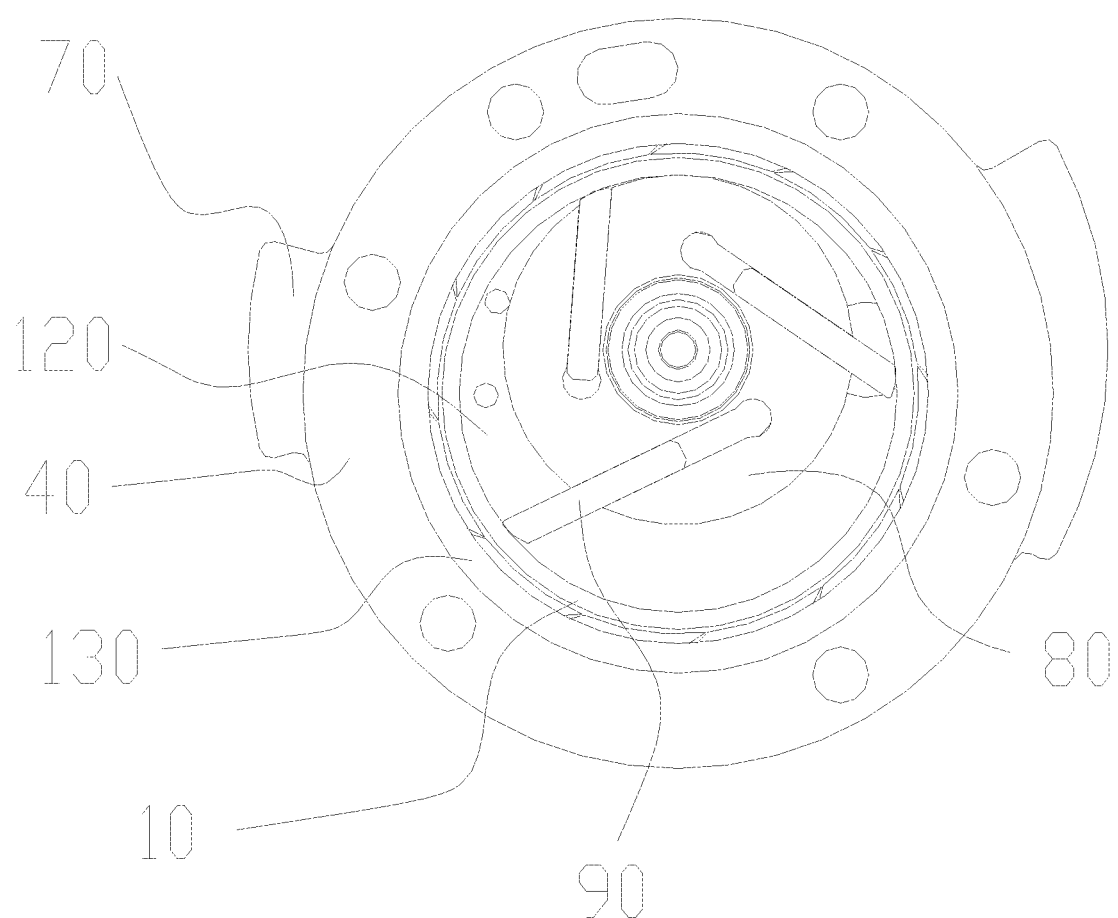
FIG. 9 illustrates a top view of another state of a partial structure of a compressor according to some embodiments of the disclosure.
Figure 10:
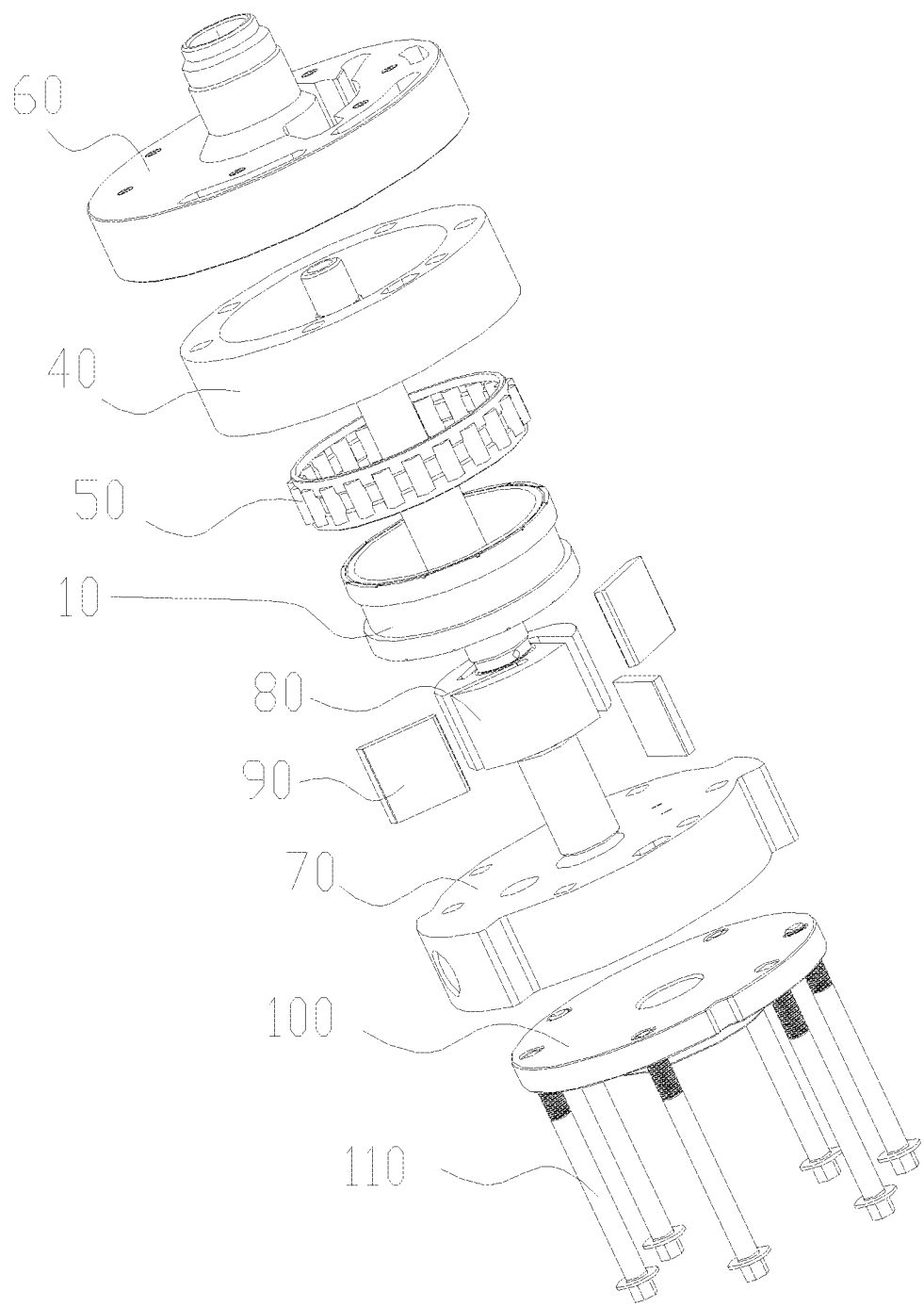
FIG. 10 illustrates an exploded view of a partial structure of a compressor according to some embodiments of the disclosure.

Some embodiments of the disclosure also provide a compressor, which includes a bearing assembly. Referring to FIG. 8 to FIG. 10, the bearing assembly is the one mentioned above.

In some embodiments, the bearing rotary ring 10 of the bearing assembly is a bearing inner ring. The compressor further includes an upper flange 60 and a lower flange 70. The bearing assembly is provided between the upper flange 60 and the lower flange 70. The bearing rotary ring 10 is rotationally disposed with respect to the upper flange 60, and is rotationally disposed with respect to the lower flange 70.

In some embodiments, the bearing assembly is a rolling bearing assembly. The bearing stationary ring 40 is a bearing outer ring, and the bearing rotary ring 10 is a bearing inner ring.

In some embodiments, the bearing assembly is suitable for both liquid seal and gas seal.

FIG. 10 shows an exploded view of a pump body of a sliding vane machine of the compressor according in some embodiments of the disclosure, including an upper flange 60, a rolling bearing assembly, a spindle 80, a sliding vane 90, a lower flange 70, a lower cover plate 100 and a pump body screw 110. The pump body screw 110 passes through a preset screw hole to fix the lower cover plate 100, the lower flange 70, the rolling bearing outer ring and the upper flange 60 together. Driven by the friction force of the head of the sliding vane, the bearing inner ring rotates along with the spindle 80 and the sliding vane 90.

According to FIG. 8 and FIG. 9, a compression chamber 120 of the new-type sliding vane compressor designed by some embodiments of the disclosure includes the bearing inner ring, the spindle 80 and the sliding vane 90, and stretches out and draws back in a sliding vane groove along with the running sliding vane 90 of the compressor, and then causes the volume change to perform suction, compression, and exhaust. The area between the bearing inner ring and the bearing outer ring is hollow (for accommodating the retainer assembly). Therefore, the bearing inner ring needs to ensure a certain sealing effect to prevent the gas in the compression chamber from leaking into the bearing race. Especially in an exhaust stage, the gas pressure in the compression chamber 120 is relatively high, while the pressure in the bearing race 130 is medium and low, so it is easy to cause leakage, resulting in the reduction of cooling capacity of the compressor.

By providing a rolling bearing assembly structure and providing oil grooves (the first lubrication passage 20 and the second lubrication passage 30) in the end face of the bearing inner ring, the compressor of some embodiments of the disclosure realizes hydrodynamic lubrication in the operation process, which reduces the friction power consumption of the end face of the bearing inner ring and the end face of the flange, and thus improve the performance and reliability of the whole compressor.

The structure of the rolling bearing assembly reduces the friction power consumption of the end face of the bearing inner ring and the end face of the flange, and improves the energy efficiency of the compressor. The problem of abnormal wear between the end face of the flange and the end face of the bearing inner ring is solved, and the reliability of the compressor is improved.

It can be seen from above description that the above embodiments of the disclosure achieve the following technical effects.

The bearing assembly of some embodiments of the disclosure is provided with the lubrication passages on the end face of the bearing rotary ring 10, so that when the bearing rotary ring 10 rotates, lubricating oil is diffused from the lubrication passages to the end face of the bearing rotary ring, and then there is sufficient lubricating oil between the end face of the bearing rotary ring 10 and its adjacent parts, so as to prevent wear in the contact process, and solve the problem that the end face of the bearing rotary ring 10 of the bearing assembly in the art known to inventors is worn excessively.

It should be noted that the specification and claims of the disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the disclosure described here are implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

For convenient description, spatially relativity terms such as "on", "above", "on the surface of", "on the top of" may be used herein to describe the spatial positional relationship of one device or one feature to other devices or features as shown in the drawings. It will be understood that the spatially relativity terms are intended to encompass different orientations used or operated in addition to the orientations of the devices described in the drawings. For example, if the device in the drawings is inverted, the device described as "on other devices or configurations" or "above other devices or configurations" will then be positioned "under other devices or configurations" or "below other devices or configurations." Thus, the exemplary term "above" may include both orientations of "above" and "below". The device may also be positioned in other different ways (rotated 90 degrees or at other orientations) and the spatially relativity description used herein is interpreted accordingly.

The above is only the preferred embodiments of the disclosure and not intended to limit the disclosure; for those skilled in the art, the disclosure may have various modifications and changes. Any modifications, equivalent replacements, improvements and the like within the spirit and principle of the disclosure should fall within the protection scope of the claims of the disclosure.

What is claimed:

1. A bearing assembly, comprising:
   a retainer assembly;
   a bearing stationary ring; and
   a bearing rotary ring, the retainer assembly being disposed between the bearing stationary ring and the bearing rotary ring, a lubrication passage being provided in an end face of the bearing rotary ring;
   wherein the lubrication passage comprises:
   a first lubrication passage provided in the end face of the bearing rotary ring;
   the first lubrication passage extends along a circumferential direction of the bearing rotary ring;
   wherein the lubrication passage further comprises:
   a second lubrication passage provided in the end face of the bearing rotary ring;
   wherein the second lubrication passage is communicated with the first lubrication passage; wherein the second lubrication passage is provided with an oil inlet and an oil outlet, the oil inlet intersects with a circumferential outer surface of the bearing rotary ring, and the oil outlet is communicated with the first lubrication passage;
   the second lubrication passage is an expansion groove, and the second lubrication passage gradually expands from the oil outlet to the oil inlet.

2. The bearing assembly as claimed in claim 1, wherein the first lubrication passage is an annular oil channel, and the first lubrication passage comprises a first side wall and a second side wall arranged opposite to the first side wall; wherein both projections of the first side wall and the second side wall on the end face of the bearing rotary ring are circular.

3. The bearing assembly as claimed in claim 2, wherein there are at least two first lubrication passages, and the at least two first lubrication passages are disposed at intervals in a direction from a circumferential outer surface of the bearing rotary ring to a circumferential inner surface of the bearing rotary ring.

4. The bearing assembly as claimed in claim 3, wherein the at least two first lubrication passages are communicated.

5. The bearing assembly as claimed in claim 3, wherein there are two first lubrication passages; the first of the two first lubrication passages and the second of the two first lubrication passages are disposed in turn in the direction from the circumferential outer surface of the bearing rotary ring to the circumferential inner surface of the bearing rotary ring; wherein, a depth of the first of the two first lubrication passages is h2, a depth of the second of the two first lubrication passages is h5, a height of the bearing rotary ring is H, and $0.05 \text{ mm} \leq h5 \leq h2 \leq 0.1H$.

6. The bearing assembly as claimed in claim 3, wherein a total width of the at least two first lubrication passages is a, an inner radius of the bearing rotary ring is r1, an outer radius of the bearing rotary ring is r4, wherein, $a \leq 0.5*(r4-r1)$.

7. The bearing assembly as claimed in claim 1, wherein the first lubrication passage comprises a first side wall and a second side wall opposite to the first side wall, both the first side wall and the second side wall are arc surfaces, an inner radius of the bearing rotary ring is r1, an outer radius of the bearing rotary ring is r4, a radius of the first side wall is r2, a radius of the second side wall is r3, wherein, r3>r2, 0.1*(r4−r1)≤r2−r1≤0.8*(r4−r1).

8. The bearing assembly as claimed in claim 1, wherein the first lubrication passage comprises a first side wall and a second side wall arranged opposite to the first side wall, both the first side wall and the second side wall are arc surfaces, an inner radius of the bearing rotary ring is r1, an outer radius of the bearing rotary ring is r4, a radius of the first side wall is r2, a radius of the second side wall is r3, wherein, 0.05 mm≤r3−r2≤0.5*(r4−r1).

9. The bearing assembly as claimed in claim 1, wherein the oil inlet and the oil outlet are disposed in turn along a rotation direction of the bearing rotary ring.

10. The bearing assembly as claimed in claim 1, wherein a first connection plane is provided between a first end of the oil outlet and a first end of the oil inlet, a second connection plane is provided between a second end of the oil outlet and a second end of the oil inlet, a preset included angle b is provided between the first connection plane and the second connection plane, wherein, 0≤b≤60°.

11. The bearing assembly as claimed in claim 1, wherein the second lubrication passage comprises a third side wall and a fourth side wall arranged opposite to the third side wall, and both the third side wall and the fourth side wall are arc surfaces.

12. The bearing assembly as claimed in claim 11, wherein a preset gap h0 is provided between centers of the third side wall and the fourth side wall, the first lubrication passage comprises a first side wall and a second side wall arranged opposite to the first side wall, the second side wall intersects with the second lubrication passage, the second side wall is an arc surface, an inner radius of the bearing rotary ring is r1, an outer radius of the bearing rotary ring is r4, a radius of the second side wall is r3, a radius of the third side wall is r5, a radius of the fourth side wall is r6, and h0+(r4−r1)≤r5≤r6≤2r3, h0≤0.2r3; or a height of the bearing rotary ring is H, a depth of the first lubrication passage is h2, a depth of the second lubrication passage is h1, and 0.05 mm≤h1≤h2≤0.1H.

13. The bearing assembly as claimed in claim wherein there are a plurality of first lubrication passages, and the plurality of first lubrication passages are disposed at intervals in a circumferential direction of the end face of the bearing rotary ring.

14. The bearing assembly as claimed in claim 1, further comprising:
a third lubrication passage provided in a circumferential outer surface of the bearing rotary ring;
wherein, the third lubrication passage is communicated with the lubrication passage.

15. The bearing assembly as claimed in claim 1, wherein both two end faces of the bearing rotary ring are provided with the lubrication passages.

16. A compressor, comprising the bearing assembly as claimed in claim 1.

17. The compressor as claimed in claim 16, wherein the bearing rotary ring of the bearing assembly is a bearing inner ring; the compressor further comprises:
an upper flange;
a lower flange, the bearing assembly being disposed between the upper flange and the lower flange;
wherein, the bearing rotary ring is rotationally disposed with respect to the upper flange, and is rotationally disposed with respect to the lower flange.

* * * * *